(12) United States Patent
Koo

(10) Patent No.: US 6,724,172 B2
(45) Date of Patent: Apr. 20, 2004

(54) METHOD FOR DETERMINING A MAXIMUM CHARGE CURRENT AND A MAXIMUM DISCHARGE CURRENT OF A BATTERY

(75) Inventor: Jae-Seung Koo, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/331,228

(22) Filed: Dec. 30, 2002

(65) Prior Publication Data

US 2004/0000892 A1 Jan. 1, 2004

(30) Foreign Application Priority Data

Jun. 26, 2002 (KR) .................... 2002-0036038

(51) Int. Cl.[7] ................ H01M 10/44; H01M 10/46
(52) U.S. Cl. ................................ 320/128
(58) Field of Search ....................... 320/127, 128, 320/135, 158, 163

(56) References Cited

U.S. PATENT DOCUMENTS

| | | | | |
|---|---|---|---|---|
| 5,307,000 A | * | 4/1994 | Podrazhansky et al. | 320/129 |
| 6,181,111 B1 | * | 1/2001 | Hoffman et al. | 322/28 |
| 6,204,645 B1 | * | 3/2001 | Cullen | 323/223 |

* cited by examiner

Primary Examiner—Edward H. Tso
(74) Attorney, Agent, or Firm—Morgan, Lewis & Bockius LLP

(57) ABSTRACT

A method for determining a maximum charge current of a battery is provided which comprises: determining a steady-state charge resistance based on a current state of charge of the battery; determining a no-load charge voltage based on the current state of charge of the battery; calculating a maximum temporary charge current; and calculating a maximum charge current based on the maximum temporary charge current.

9 Claims, 4 Drawing Sheets

METHOD FOR DETERMINING A MAXIMUM CHARGE CURRENT AND A MAXIMUM DISCHARGE CURRENT OF A BATTERY

FIELD OF THE INVENTION

The present invention relates to a method for determining a maximum charge current and a maximum discharge current of a rechargeable battery for a hybrid electric vehicle. More particularly, the present invention relates to a method for determining a maximum charge current and a maximum discharge current of the battery in order to increase battery efficiency, to prevent damage to the battery, and to increase the lifespan of the battery.

BACKGROUND OF THE INVENTION

Generally, the dischargeable power of a battery varies in accordance with the state of charge of the battery. In an electric vehicle, in order to prevent damage to the battery, the motor controller receives a varying chargeable (i.e., charging and discharging) current, depending on the stage of the state of charge for the battery. For example, if the state of charge of the battery is above 30%, the maximum discharge current can be utilized. However, as the state of charge decreases, the maximum discharge current also decreases, to protect the battery.

The allowable discharge current according to the state of charge may be determined through experimentation, as shown by the graph in FIG. 1 depicting one example of a maximum discharge current. Because the battery of an electric vehicle is mainly discharged during the operation of the vehicle, it is useful to determine the maximum discharge current at various stages of the state of charge of the battery.

In addition to being discharged, the battery of a hybrid electric vehicle is also periodically charged. The discharging of electricity from the battery and the charging of the battery occur alternately. In order to increase the efficiency of the hybrid electric vehicle and to improve fuel economy, the battery of the hybrid electric vehicle preferably outputs a maximum discharge current and preferably receives a maximum charge current.

Different techniques have been proposed for determining the maximum discharge current, but a method for determining the maximum charge current has not previously been introduced. The maximum discharge current cannot simply be the same as the maximum charge current, or the battery will not operate at its maximum efficiency.

FIGS. 2A and 2B demonstrate how some prior-art techniques underestimate maximum charge and discharge currents, resulting in available power that is not utilized, represented by the shaded portions of the graph.

The information disclosed in this Background section is only for enhancement of understanding of the background of the invention and should not be taken as an acknowledgement or any form of suggestion that this information forms the prior art that is already known to a person skilled in the art.

SUMMARY OF THE INVENTION

In a preferred embodiment of the present invention, a method for determining a maximum charge current of a battery comprises determining a steady-state charge resistance based on a current state of charge of the battery, and determining a no-load charge voltage based on the current state of charge of the battery. The method further comprises calculating a maximum temporary charge current, and calculating a maximum charge current based on the maximum temporary charge current.

Preferably, the maximum temporary charge current is calculated by the following equation: [(the maximum charge voltage−the no-load charge voltage)/(the steady-state charge resistance)].

Also, preferably, the maximum charge current is calculated by the following equation: [(the maximum temporary charge current)*(predetermined charge time period gain)].

In another preferred embodiment of the present invention, a method for determining a maximum discharge current of a battery comprises determining a steady-state discharge resistance based on a current state of charge of the battery, and determining a no-load discharge voltage based on the current state of charge of the battery. The method further comprises calculating a maximum temporary discharge current, and calculating a maximum discharge current based on the maximum temporary discharge current.

Preferably, the maximum temporary discharge current is calculated by the following equation: [(the no-load discharge voltage−the minimum discharge voltage)/(the steady-state discharge resistance)].

It is also preferable that the maximum discharge current is calculated by the following equation: [(the maximum temporary discharge current)*(predetermined discharge time period gain)].

In other preferred embodiments, the methods described above can be implemented as logic in a battery management system.

In yet another preferred embodiment of the present invention, a method of more accurately determining maximum charging and discharging currents for a battery of a hybrid electric vehicle comprises determining a plurality of maximum voltage differentials corresponding to a plurality of possible state of charges for the battery. Each maximum voltage differential is based on a difference between a predetermined voltage limit for the battery and a no-load voltage value for each of the plurality of possible state of charges.

The method also comprises determining a plurality of steady-state resistances corresponding to the plurality of possible state of charges, and measuring a first state of charge of the battery. Finally, the method comprises determining one of a maximum charge current and a maximum discharge current by dividing the maximum voltage differential corresponding to the first state of charge by the steady-state resistance corresponding to the first state of charge.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

A typical system to which the methods of the present invention are applied includes a battery and a battery control unit. The battery control unit controls charging and discharging of the battery. The battery control unit preferably includes a processor, a memory, and other necessary hardware and software components, as will be understood by persons skilled in the art, to permit the control unit to communicate with sensors and execute the control functions as described herein.

Figure 6:
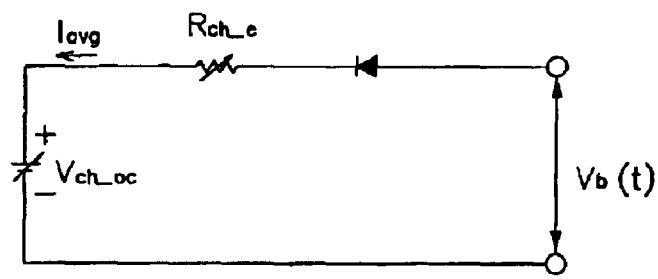
FIG. 6 is a steady-state equivalent circuit of a battery being charged, to which the method for determining a maximum charge current according to a preferred embodiment of the present invention is applied.

FIG. 6 shows an example of an equivalent circuit of a battery during charging, from which a maximum charge current can be derived in accordance with a preferred embodiment of the present invention. From this figure, and from Ohm's law, the following equation is obtained:

$$V_b(t) = V_{ch\_oc} + I_{avg} \times R_{ch\_e}$$

where: $V_b(t)$ is a battery charge voltage, $V_{ch\_e}$ is a no-load charge voltage, and $R_{ch\_e}$ is a steady-state resistance during charging.

The battery charge voltage can be determined as a function of the charging time, and approximates a maximum charge voltage in a steady-state. The maximum charge voltage of the battery is predetermined according to battery characteristics.

The no-load charge voltage is preferably determined in accordance with the state of charge of the battery. The state of charge indicates an amount of energy remaining in the battery pack, and is defined as the ratio of the remaining capacity of the battery to the fully-charged capacity of the battery. Various methods for measuring the state of charge have been developed, and are well-known in the art.

The steady-state charge resistance can be determined in accordance with the state of charge of the battery, and can also be determined through experimentation.

Thus, both the no-load charge voltage and the steady-state charge resistance can uniquely be determined at a specific state of charge of the battery. Consequently, at a specific state of charge of the battery, a maximum temporary charge current can then be calculated from the above equation (using the no-load charge voltage and the steady-state charge voltage), based on the maximum charge voltage of the battery.

Although FIG. 6 shows one example of an equivalent circuit for determining the maximum charge current of a battery in accordance with a preferred embodiment of the present invention, it will be appreciated that the methods according to the present invention may be applied to other equivalent circuits of various batteries.

Figure 3:
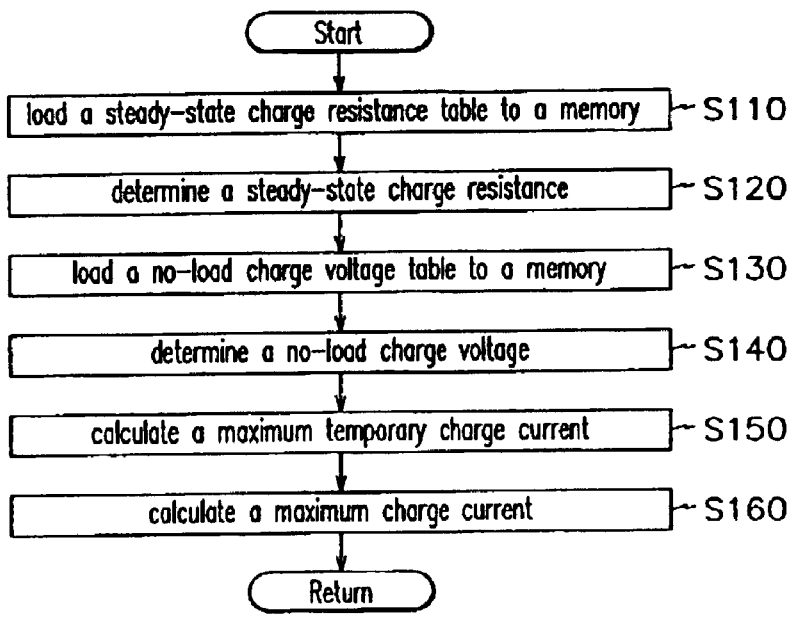
FIG. 3 is a flowchart of a method for determining a maximum charge current of a battery according to a preferred embodiment of the present invention.

Referring now to the flowchart of FIG. 3, additional detail on the method for determining a maximum charge current in accordance with a preferred embodiment is shown. In this figure, the battery control unit first loads a steady-state charge resistance table into a memory (S110). The steady-state charge resistance table contains charge resistances for each state of charge of the battery in the steady-state condition. The charge resistances can be determined through experimentation.

Next, the battery control unit determines a steady-state charge resistance at a current state of charge of the battery from the steady-state charge resistance table (S120). The battery control unit loads a no-load charge voltage table into a memory (S130). The no-load charge voltage table contains no-load charge voltages corresponding to each state of charge of the battery. The battery control unit then determines a no-load charge voltage at a current state of charge of the battery from the no-load charge voltage table (S140).

Next, the battery control unit calculates a maximum temporary charge current (S150) according to the following equation: Maximum temporary charge current=[(maximum charge voltage−no-load charge voltage)/(steady-state charge resistance)]. Finally, the battery control unit calculates a maximum charge current (S160) according to the following equation: Maximum charge current=[(maximum temporary charge current)*(predetermined charge time period gain)].

The "predetermined charge time period gain" is a gain based on a specific time period for charging. For example, for a battery of a hybrid vehicle, the charge time period can be 10 seconds. Then, the charge time period "gain" will preferably be greater than 1 if the charge time period is shorter than 10 seconds, and will preferably be less than 1 if the charge time period is longer than 10 seconds.

Figure 7:
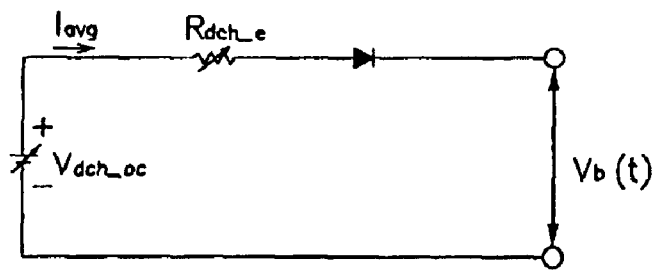
FIG. 7 is a steady-state equivalent circuit of a battery being discharged, to which the method for determining a maximum discharge current according to a preferred embodiment of the present invention is applied.

FIG. 7 shows an equivalent circuit of a battery during discharging, from which a maximum discharge current can be derived in accordance with a preferred embodiment of the present invention. From this figure, and from Ohm's law, the following equation is obtained:

$$V_b(t) = V_{dch\_oc} - I_{avg} \times R_{dch\_e}$$

where: $V_b(t)$ is a battery discharge voltage, $V_{dch\_oc}$ is a no-load discharge voltage, and $R_{dch\_e}$ is a state-steady resistance on discharge.

The battery discharge voltage can be determined as a function of discharge time, and approximates a minimum discharge voltage in a steady-state. The minimum discharge voltage of the battery is predetermined according to battery characteristics.

The no-load discharge voltage is preferably determined in accordance with the state of charge of the battery. The steady-state discharge resistance can also be determined in accordance with the state of charge of the battery, and can be determined through experimentation.

Thus, both the no-load discharge voltage and the steady-state discharge resistance can uniquely be determined at a specific state of charge of the battery. Consequently, at a specific state of charge of the battery, a maximum temporary discharge current can then be calculated from the above equation (using the no-load discharge voltage and the steady-state discharge voltage), based on the minimum discharge voltage of the battery.

Although FIG. 7 shows one example of an equivalent circuit for determining the maximum discharge current of a battery in accordance with a preferred embodiment of the present invention, it will be appreciated that the methods according to the present invention may be applied to other equivalent circuits of various batteries.

Figure 4:
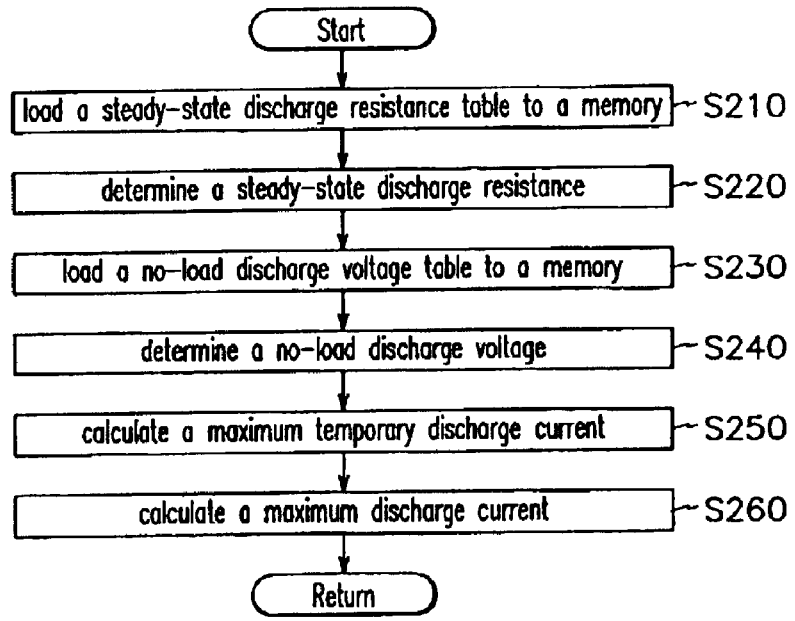
FIG. 4 is a flowchart of a method for determining a maximum discharge current of a battery according to another preferred embodiment of the present invention.

Referring now to the flowchart of FIG. 4, additional detail on the method for determining a maximum discharge current in accordance with a preferred embodiment is shown. In this figure, the battery control unit loads a steady-state discharge resistance table into a memory (S210). The steady-state discharge resistance table contains discharge resistances for each state of charge of the battery in the steady-state condition. The discharge resistances can be determined through experimentation.

Next, the battery control unit determines a steady-state discharge resistance at a current state of charge of the battery from the steady-state discharge resistance table (S220). The battery control unit loads a no-load discharge voltage table into a memory (S230). The no-load discharge voltage table contains no-load discharge voltages corresponding to each state of charge of the battery. The battery control unit then determines a no-load discharge voltage at a current state of charge of the battery from the no-load discharge voltage table (S240).

Next, the battery control unit calculates a maximum temporary discharge current (S250) according to the following equation: Maximum temporary discharge current=[(no-load discharge voltage−minimum discharge voltage)/(steady-state discharge resistance)]. Finally, the battery control unit calculates a maximum discharge current (S260) according to the following equation:

Maximum discharge current=[(maximum temporary discharge current)*(predetermined discharge time period gain)]

The discharge time period gain can be determined on the same basis as the charge time period gain, described above.

Figure 1:
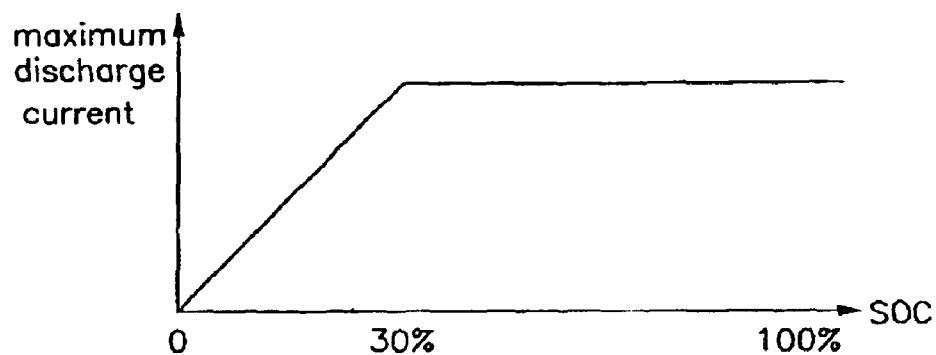
FIG. 1 is a graph illustrating one example of a maximum discharge current correlated to the state of charge of the battery.
Figure 2A:
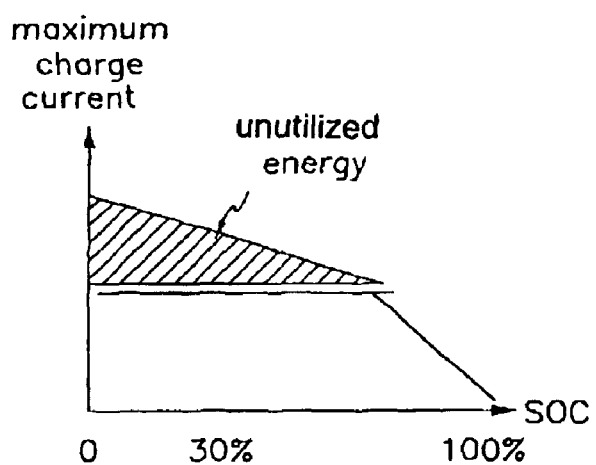
FIGS. 2A and 2B are graphs illustrating underestimated maximum charge and discharge currents.
Figure 2B:
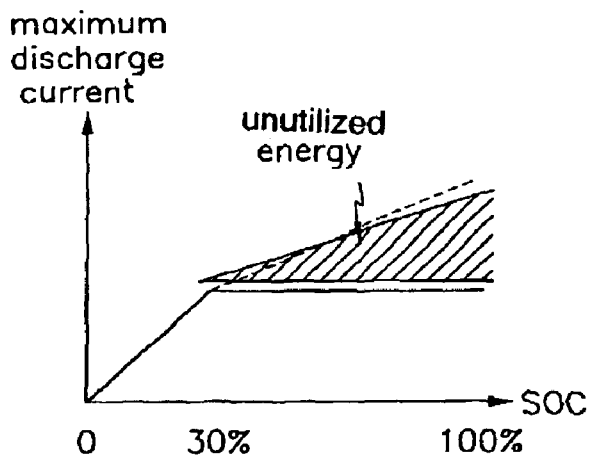
Figure 5A:
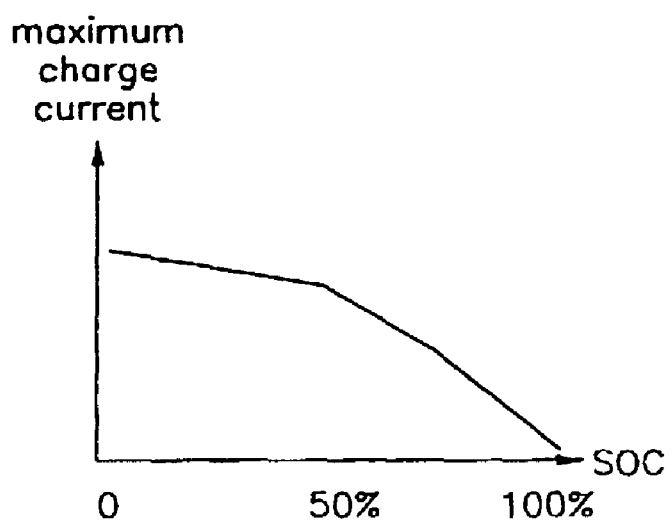
FIGS. 5A and 5B are graphs showing the maximum charge current and the maximum discharge current, respectively, according to preferred embodiments of the present invention.
Figure 5B:
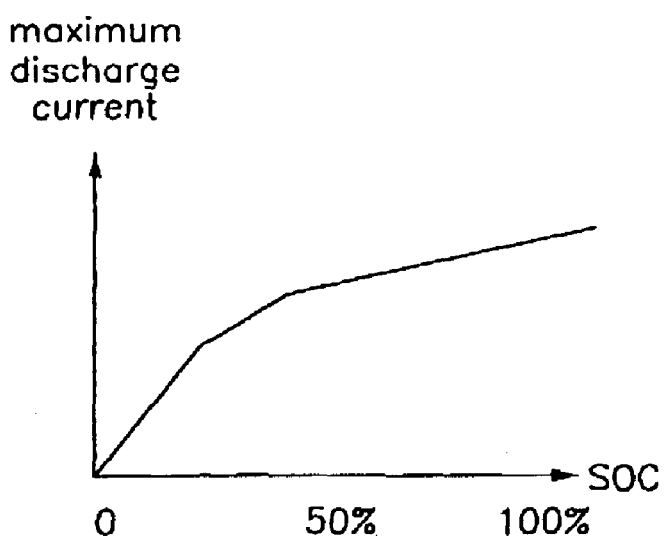

Turning now to FIGS. 5A and 5B, maximum charge (5A) and discharge (5B) currents that can be determined according to preferred embodiments of the present invention are shown. The maximum charge and discharge currents increase the efficiency and lifespan of the battery, because charging and discharging is performed at more accurate levels of current so that damage to the battery can be decreased. (This can be seen from a comparison of, for example, the charge and discharge currents of FIGS. 5A–B to the corresponding currents shown in FIGS. 2A–B).

Although preferred embodiments of the present invention have been described in detail hereinabove, it should be clearly understood that many variations and/or modifications of the basic inventive concepts herein taught which may appear to those skilled in the present art will still fall within the sprit and scope of the present invention, as defined in the appended claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. A method for determining a maximum charge current of a battery, comprising:
   determining a steady-state charge resistance based on a current state of charge of the battery;
   determining a no-load charge voltage based on the current state of charge of the battery;
   calculating a maximum temporary charge current; and
   calculating a maximum charge current based on the maximum temporary charge current.

2. The method of claim 1, wherein the battery has a maximum charge voltage, and further wherein the maximum temporary charge current is calculated by: [(the maximum charge voltage−the no-load charge voltage)/(the steady-state charge resistance)].

3. The method of claim 1, wherein the maximum charge current is calculated by: [(the maximum temporary charge current)*(a predetermined charge time period gain)].

4. A method for determining a maximum discharge current of a battery, comprising:
   determining a steady-state discharge resistance based on a current state of charge of the battery;
   determining a no-load discharge voltage based on the current state of charge of the battery;
   calculating a maximum temporary discharge current; and
   calculating a maximum discharge current based on the maximum temporary discharge current.

5. The method of claim 4, wherein the battery has a minimum discharge voltage, and further wherein the maximum temporary discharge current is calculated by: [(the no-load discharge voltage−the minimum discharge voltage)/(the steady-state discharge resistance)].

6. The method of claim 4, wherein the maximum discharge current is calculated by: [(the maximum temporary discharge current)*(a predetermined discharge time period gain)].

7. A battery management system for managing a battery of a hybrid electric vehicle, the battery management system determining a maximum charge current of the battery, the battery management system comprising:
   a processor for controlling charging of the battery;
   memory for storing instructions for execution by the processor;
   a first module stored in the memory, the first module comprising:
      logic for determining a steady-state charge resistance based on a current state of charge of the battery;
      logic for determining a no-load charge voltage based on the current state of charge of the battery;
      logic for calculating a maximum temporary charge current; and
      logic for calculating a maximum charge current based on the maximum temporary charge current.

8. A battery management system for managing a battery of a hybrid electric vehicle, the battery management system determining a maximum discharge current of the battery, the battery management system comprising:
   a processor for controlling discharging of the battery;
   memory for storing instructions for execution by the processor;
   a first module stored in the memory, the first module comprising:
      logic for determining a steady-state discharge resistance based on a current state of charge of the battery;
      logic for determining a no-load discharge voltage based on the current state of charge of the battery;
      logic for calculating a maximum temporary discharge current; and
      logic for calculating a maximum discharge current based on the maximum temporary discharge current.

9. A method of more accurately determining maximum charging and discharging currents for a battery of a hybrid electric vehicle, the method comprising:
   determining a plurality of maximum voltage differentials corresponding to a plurality of possible state of charges for the battery, each maximum voltage differential based on a difference between a predetermined voltage limit for the battery and a no-load voltage value for each of the plurality of possible state of charges;

determining a plurality of steady-state resistances corresponding to the plurality of possible state of charges;

measuring a first state of charge of the battery;

determining one of a maximum charge current and a maximum discharge current by dividing the maximum voltage differential corresponding to the first state of charge by the steady-state resistance corresponding to the first state of charge.

* * * * *